June 10, 1930.  W. H. MORGAN  1,763,632
CANE HARVESTER
Filed Dec. 11, 1924   4 Sheets-Sheet 1
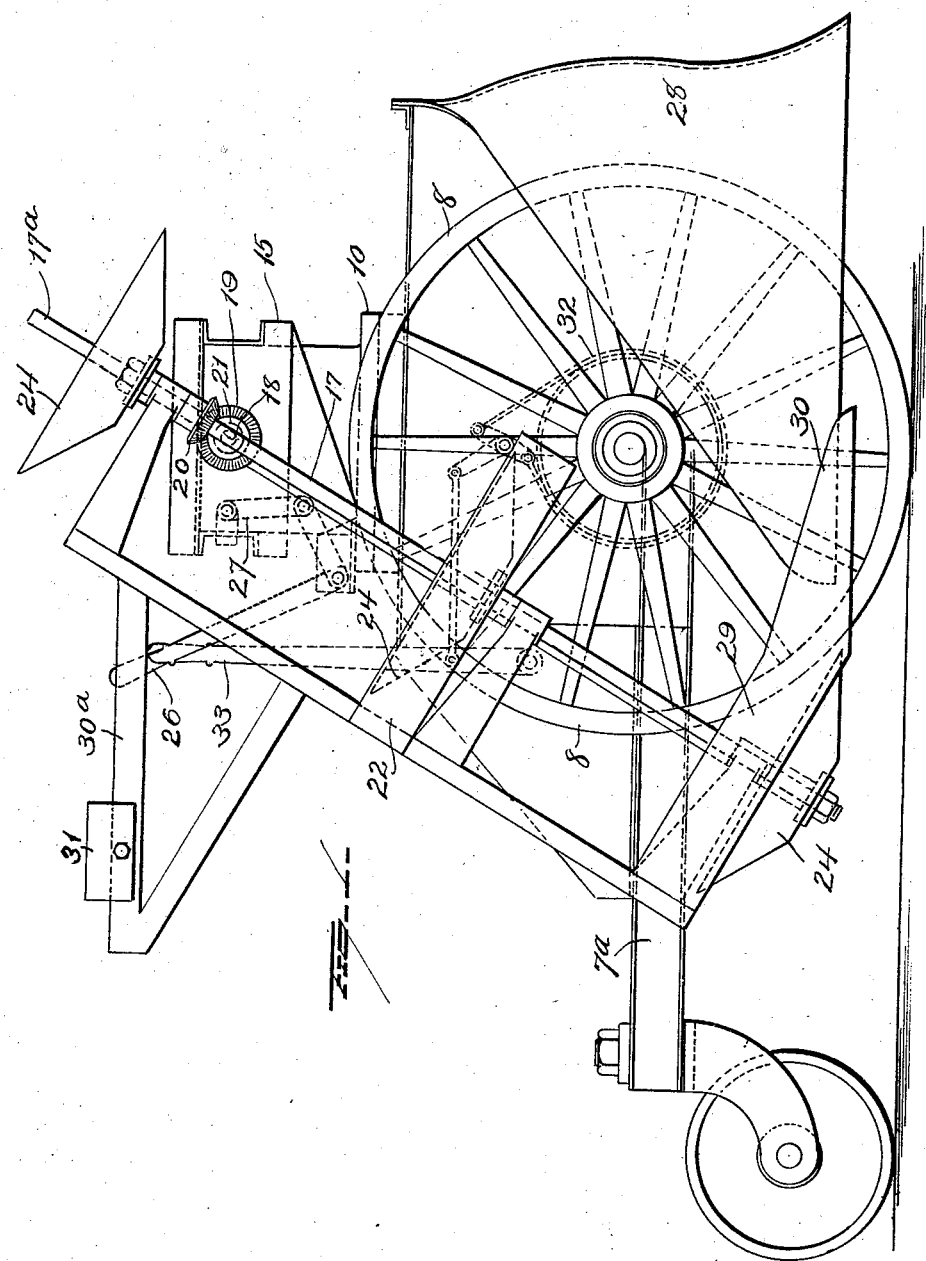

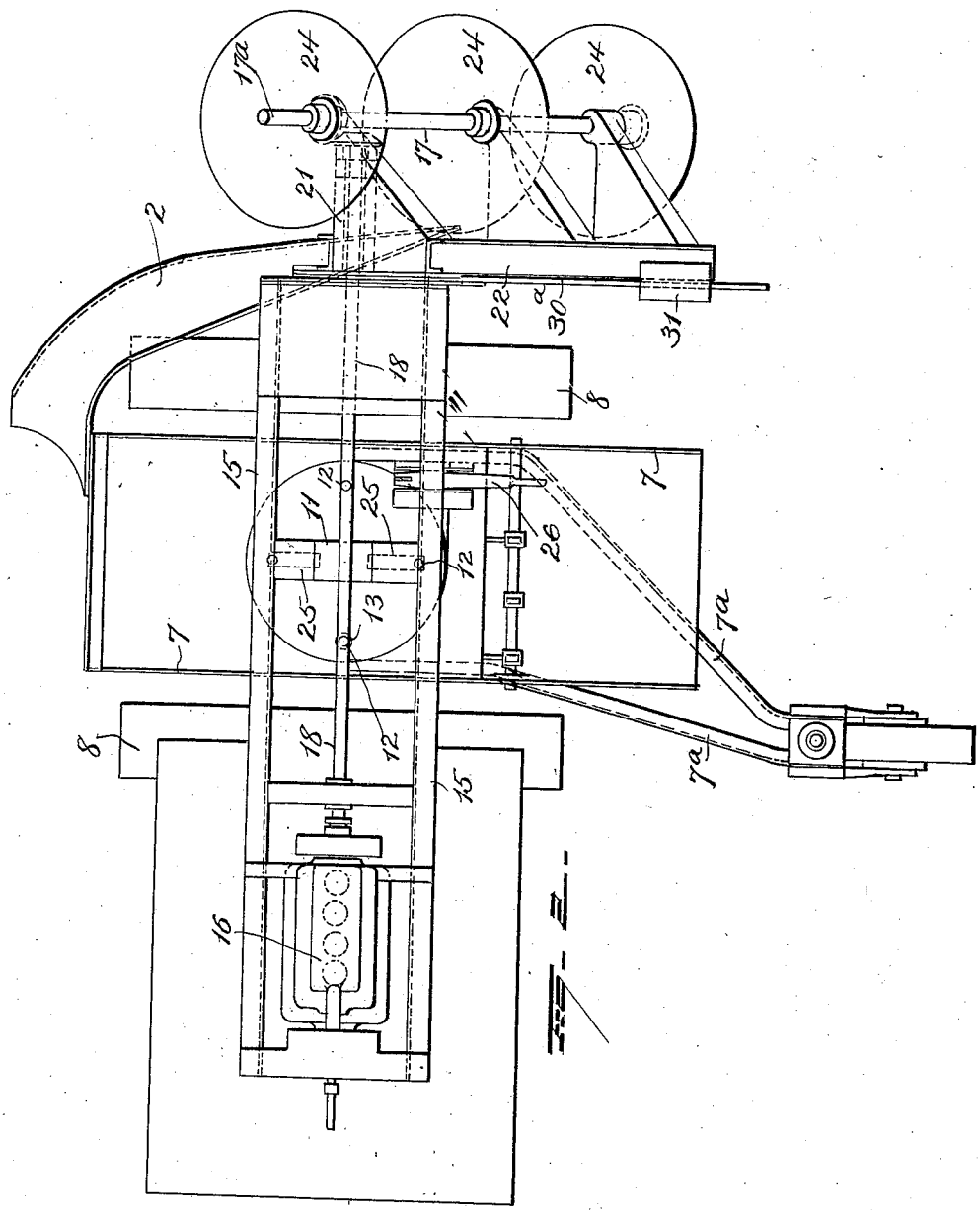

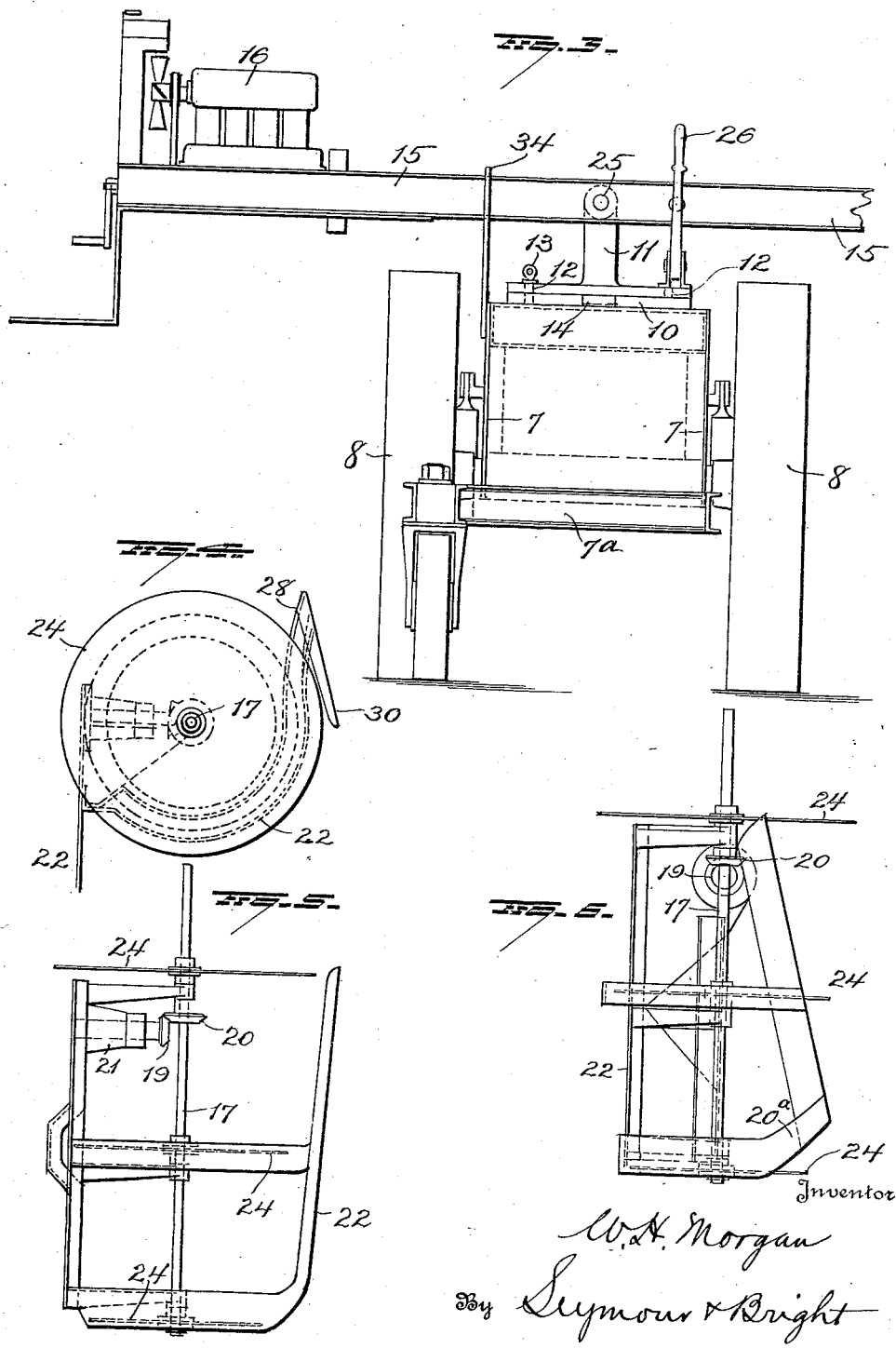

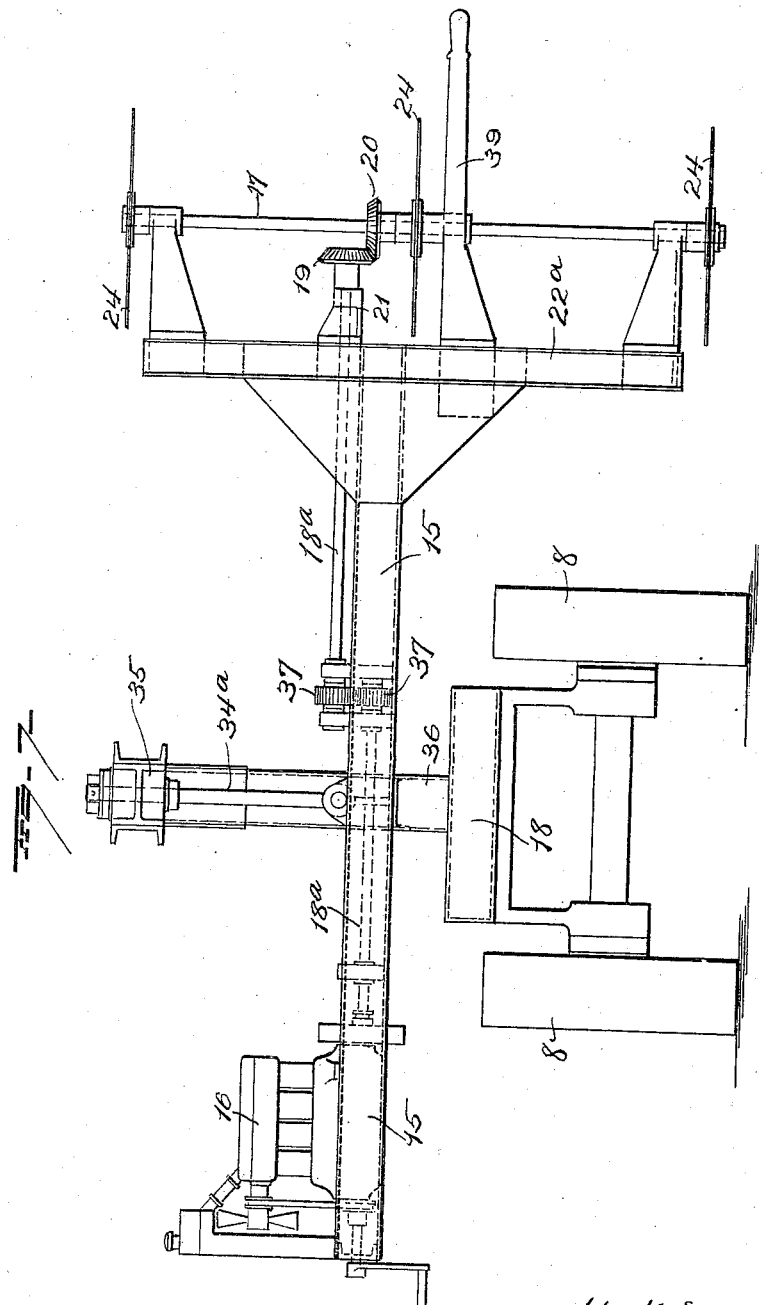

Patented June 10, 1930

1,763,632

UNITED STATES PATENT OFFICE

WILLIAM HENRY MORGAN, OF ALLIANCE, OHIO, ASSIGNOR, BY MESNE ASSIGNMENTS, TO THE MORGAN HURRYCANE COMPANY, OF NEW YORK, N. Y., A CORPORATION OF FLORIDA

CANE HARVESTER

Application filed December 11, 1924. Serial No. 755,251.

My invention relates to an apparatus for harvesting sugar cane and the like. It is an object of this invention to provide an apparatus that can be drawn through cane fields and cut the stalks adjacent to the ground irrespective of irregularities in the surface of the latter.

A further object is to provide a harvester with cutting mechanism that will cut the stalks at the base and simultaneously cut them into sections.

A further object is to provide a device of the character above described adapted to be drawn by animals or by mechanical means, such as, a wheel or caterpillar tractor.

With these and other objects in view, my invention includes the parts and combination of parts and the construction more fully described and claimed below.

In the accompanying drawings:

Figure 1 is a side elevation of my improved harvester;

Figure 2 is a view in plan of the same;

Figure 3 is a view in end elevation of a modified form, the cutters being omitted;

Figures 4, 5 and 6 are views of the cutters and stalk guides, and

Figure 7 is an end view of a modified construction.

The machine consists of a rectangular main frame 7 mounted upon suitable ground wheels and provided with a rearwardly extending bracket 7ª carrying the guide or castor wheel. The form shown in Figure 3 is provided centrally with a bearing plate 10 which is rigidly secured thereto and forms a base for the flanged post 11 which is journalled on the bearing plate 10. The flanges of this post are provided with a series of holes 12 which permits it to be revolved and be held in place by pin 13 passing through one of said holes and through a similar hole in the bearing plate 10. The post is provided centrally at its lower end with a projecting stud 14 which rests within a hole or recess in the bearing plate 10 and forms the axis on which the post 11 turns. Pivotally mounted on the upper end of the post is the cutter carrier frame 15 (shown in Figures 1—2 and 7) which is rectangular in form and longer than the width of the main frame 7 so as to project beyond the latter and both sides thereof as clearly shown in Figures 3 and 7. This frame 15 carries at one end a motor 16 and is preferably of the gasoline engine type and which drives the cutter shaft 17 through drive shaft 18 and beveled gears 19 and 20. In Figures 1 and 2 the cutter shaft 17 is pivotally supported at 21 to permit it with its cutters together with the frame 22 carrying the shaft to oscillate thereon. Cutter shaft 17 is mounted in a frame 22 which is supported on the carrier frame 15 and which is free to oscillate with the cutter shaft 17. Adjustably mounted on the cutter shaft 17 are cutters 24 which may be cone shaped as shown in Figure 1, or flat as shown in Figures 5, 6 and 7.

While I have referred to three cutters I may use more than three and all of the cutters 24 above the lower one, are secured to hubs which may be adjusted on the shaft 17, to accommodate the cutters of stalks to various lengths. Should it be desired to simply sever the stalks from the ground, the cutter or cutters 24 above the lower cutter may be removed altogether.

In the construction shown in Figures 1 and 2 the cutter shaft 17 is provided at its upper end with an extension to permit of the vertical adjustment of the cutter 24. In Figures 1 and 2 the cutter 17ª carrier frame 15 is pivotally supported on posts 11 and oscillates on the pins 25. The oscillation of the carrier is actuated by bell crank hand lever 26 which is connected to the frame 15 by link 27 so that a shifting movement of bell crank lever 26 will produce a vertical oscillation of the cutter carrier 15 and thus move the cutter shaft 17 up or down as necessity may demand.

In the construction shown in Figure 2, bell crank lever 26 is pivoted at its elbow to bearings attached to the said frame 12 to be moved with the latter.

Attached to main frame 7 is guide or guard 28, and attached to the cutter frame 22 is guide 29, the former of which is for directing the stalks in toward the cutters and the latter for moving the stalks towards the center of the cutter and also for keeping the lower cutter out of contact with the ground, the latter being effected by the tail 30 formed on the cutter carrying frame, as shown in Figures 1 and 4.

The cutter carying frame 22 is provided with a bracket 30$^a$ on which is suitably mounted counterweight 31 which can be adjusted along the said bracket so as to keep the cutter frame in a vertical position when flat cutters are used or at an angle when the dished cutters such as shown in Figure 1 are used, stops being provided at the proper point for this purpose.

Each of ground wheels 8 when the latter are used may be provided with a band type of brake 32 controlled by levers as shown at 33 respectively. With this arrangement by tightening one brake 32 one wheel will be prevented from revolving and acts as a pivot about which the entire machine may revolve, thus permitting a very accurate guiding of the machine along the row of cane to be cut. Should both brakes 32 be tightened by their respective levers at the same time, the entire apparatus would be braked as in going down a hill.

34 is a hook-shaped lock adapted to overlap or engage frame 15 for holding the latter horizontal and immovable while moving it from place to place.

In the construction shown in Figure 7, the saw or cutter carrying frame 22$^a$ is fixed to the oscillating and rotating frame 15 so that it has simply an upward and downward movement with the latter, and the frame 15 is shown suspended from the bolt or hanger 34$^a$ which is mounted to rotate in the bearing 35 carried on the uprights 36 secured to the vehicle frame 18. In this figure I have also shown the cutter operating shaft 18$^a$ made in two sections connected by gears 37 but this is not essential.

In the construction shown in Figures 4, 5 and 6, I have shown the saws or cutters and their guards, the saws or cutters being of different diameters, the smallest cutter being at the lower end of the cutter shaft 17 and the largest at the top, the intermediate cutter or cutters increasing in diameter upwardly.

The cutter guard or frame, shown in detail in Figures 4, 5 and 6 is constructed to gather in the stalks and hold them in contact with the cutters, and in the construction shown in Figure 6 the cutter guard is provided with a section or member 20$^a$ which conforms to the tail 20 shown in Figure 4 and which operates to contact with projections from the surface of the ground and lift or tilt the frame rearwardly so as to prevent contact of the lower cutter with the surface of the ground.

In Figures 2 and 7, the cutters are of the same diameter, and in Figure 7 the cutter frame 22$^a$ is provided with a hand lever 39 by which the cutter frame, cutters and cutter carrying frame 15 can be tilted normally, by an operator walking with the harvester.

Instead of having the cutter carrying frame tilt as previously described, it may be mounted to rotate only and provided adjacent one end with a tilting frame, such as 22 carrying the cutting shaft and cutters. Again, instead of the cutting shaft being vertical, as shown in Figure 7, it may be at an angle as shown in Figures 1 and 2.

It is evident that many other changes might be resorted to in the relative arrangement of parts shown and described without departing from the spirit and scope of my invention, hence I would have it understood that I do not wish to confine myself to the exact construction and arrangement of parts shown and described.

Having fully described my invention what I claim as new and desire to secure by Letters Patent, is:—

1. In a cane harvester, the combination of a main frame mounted on wheels, a cutter carrying frame located at one side of said main frame, means carried by the main frame and supporting the cutter carrying frame, the said cutter carrying frame being mounted to tilt with reference to the main frame, a cutter carrying shaft mounted in said cutter carrying frame, a plurality of cutters carried by said shaft and means for rotating said shaft.

2. In a cane harvester, the combination of a main frame mounted to travel, a horizontal frame on said main frame, the said horizontal frame mounted to tilt with reference to said main frame and also to turn on said main frame, a cutter carrying shaft carried by the horizontal frame and means for rotating said shaft.

3. In a cane harvester, the combination of a main frame mounted to travel, a movable frame mounted on said main frame and adapted to turn upon and tilt with reference to said main frame, one end of the movable frame projecting beyond one side of the main frame, a cutter carrying shaft mounted in the projecting end of the movable frame, a cutter on said shaft adjacent the lower end thereof and an engine and connections for rotating said shaft.

4. In a cane harvester, the combination of a main frame mounted to travel, a cutter carrying frame mounted to tilt and rotate on said main frame, the horizontal frame projecting beyond one side of the main frame, a cutter shaft mounted to rotate in bearings carried by said horizontal frame, and an engine operatively connected with the cutter shaft for rotating the same.

5. In a cane cutter, the combination of a main frame mounted on wheels, a cutter carrying frame located at the outer side of one of the wheels thereof, means carried by the main frame and supporting the cutter carrying frame, a shaft mounted in the cutter carrying frame, and a series of cutters on said shaft, the cutters increasing in diameter from the lower one up, the lowermost cutter on said shaft adapted to sever the stalks near the ground.

6. In a cane harvester, the combination of a main frame mounted on wheels, a cutter carrying frame located at the outer side of the frame and supporting means carried by the main frame and supporting the cutter carrying frame, said cutter carrying frame mounted to tilt with reference to the main frame cutter shaft carried by said cutter carrying frame, cutters on said shaft, and means carried by the supporting means for rotating the cutter carrying shaft.

7. In a cane harvester, the combination of a main frame, a cutter carrying frame mounted on said main frame and projecting beyond the latter at one side thereof, a frame journalled to said carrying frame, a shaft carried in said journalled frame and a cutter on the shaft.

8. In a cane harvester, the combination of a main frame mounted to travel, a support mounted on the main frame and projecting beyond one side of the main frame, a cutter shaft journaled in the projecting end of the said support, a cone shaped cutter on said shaft and means carried by the support for rotating the cutter shaft.

9. In a cane harvester, the combination of a main frame mounted on ground wheels, a tilting frame located on the outer side of one of the ground wheels, means carried by the main frame and supporting the tilting frame, a cutter shaft journaled in the tilting frame, a cutter thereon and means for rotating the cutter shaft.

10. In a cane harvester, the combination of a main frame, a tilting frame, a stalk guiding frame carried by said tilting frame, cutter shaft operating means carried by the tilting frame, and a cutter shaft within said stalk guiding frame.

11. In a cane harvester, the combination of a main frame, a movable frame on said main frame and adapted to tilt, a cutting shaft adjacent one end of the movable frame and carrying a cutter, the said cutting shaft adapted to be tilted or swung backwardly or forwardly, and means on said movable frame for rotating the cutter shaft.

12. In a cane harvester, the combination of a main frame mounted on ground wheels, a rotatable frame carried by said main frame and adapted to be tilted with respect thereto, a cutter carrying frame carried by said rotatable frame, a cutter shaft journaled in the cutter carrying frame and means for rotating said cutter shaft.

13. In a cane harvester, the combination of a main frame, a horizontally rotating frame carried thereby, a cutter shaft carrying frame at one end of the rotating frame, a cutter shaft mounted to rotate in the cutter shaft carrying frame and means for rotating said shaft.

14. In a cane harvester, the combination of a main frame mounted on ground wheels, a tilting frame carried by said main frame and projecting beyond the side of the main frame, a cutter carrying shaft carried by said tilting frame at the projecting end thereof and at the outer side of a ground wheel of the main frame and means for rotating the cutter shaft.

15. In a stalk harvester, the combination of a main frame, a rotatable frame thereon, a cutter carrying frame journalled to said rotatable frame at one end of the latter and to one side of the main frame, a shaft mounted in said cutter frame and means for rotating the shaft.

16. In a stalk harvester, the combination of a main frame, a rotatable frame mounted thereon, a cutter shaft frame journalled to said rotatable frame adjacent one end of the latter and outside of the main frame, a cutter shaft mounted in said cutter shaft frame, means for holding the shaft in proper cutting position, and means for automatically tilting said cutter shaft frame.

17. In a stalk harvester, the combination of a main frame, a rotatable frame mounted thereon, a cutter shaft frame journalled on said rotatable frame adjacent one end of the latter, means contacting with the surface of the ground for throwing the cutter shaft carrying frame rearwardly.

18. A machine for harvesting sugar cane comprising a body frame, a support carried by said frame and a plurality of spaced cane cutting devices carried by said support and freely movable vertically with reference to said body frame to allow the cane cutting devices to follow the contour of the ground.

19. A machine for harvesting sugar cane comprising a body frame, a shaft having cane cutting devices secured thereto, means for rotating said shaft, and means supporting said shaft and movably secured to said frame to allow free movement of said shaft and cutting devices vertically whereby said shaft and cutters follow the contour of the ground.

20. A machine for harvesting sugar cane comprising a body frame supported on wheels, a support secured to said frame and extending beyond the same and outside of said wheels, cane cutting devices carried by said support and means for operating said cane cutting devices, said support and cane cutting devices being movable vertically with reference to said body whereby said cane cutting devices follow the contour of the ground.

21. A machine for harvesting sugar cane comprising a body frame mounted on wheels, a shaft having cane cutting devices secured thereto, and a support in which said shaft is mounted, said support being movably secured to said frame and extending beyond the same and outside of the wheels whereby said shaft and cutting devices are free to move vertically with reference to said frame to follow the contour of the ground.

In testimony whereof, I have signed this specification.

WILLIAM HENRY MORGAN.

CERTIFICATE OF CORRECTION.

Patent No. 1,763,632.                       Granted June 10, 1930, to

WILLIAM HENRY MORGAN.

It is hereby certified that error appears in the printed specification of the above numbered patent requiring correction as follows: Page 2, line 6, for the misspelled word "carying" read carrying; same page, lines 119 and 120, claim 4, for "cutter carrying" read horizontal; page 3, line 15, claim 6, after the word "frame" insert a comma; and that the said Letters Patent should be read with these corrections therein that the same may conform to the record of the case in the Patent Office.

Signed and sealed this 5th day of August, A. D. 1930.

Wm. A. Kinnan,
                                           Acting Commissioner of Patents.

(Seal)